US012394417B2

(12) United States Patent
Chang

(10) Patent No.: US 12,394,417 B2
(45) Date of Patent: Aug. 19, 2025

(54) CASCADED AUDIOVISUAL AUTOMATIC SPEECH RECOGNITION MODELS

(71) Applicant: Google LLC, Mountain View, CA (US)

(72) Inventor: Oscar Chang, New York, NY (US)

(73) Assignee: Google LLC, Mountain View, CA (US)

( * ) Notice: Subject to any disclaimer, the term of this patent is extended or adjusted under 35 U.S.C. 154(b) by 388 days.

(21) Appl. No.: 18/163,836

(22) Filed: Feb. 2, 2023

(65) Prior Publication Data
US 2024/0265917 A1 Aug. 8, 2024

(51) Int. Cl.
| | | |
|---|---|---|
| G10L 15/24 | (2013.01) | |
| G10L 15/02 | (2006.01) | |
| G10L 15/06 | (2013.01) | |
| G10L 15/08 | (2006.01) | |
| G10L 15/16 | (2006.01) | |
| G10L 15/197 | (2013.01) | |
| G10L 15/22 | (2006.01) | |
| G10L 15/25 | (2013.01) | |
| G10L 25/57 | (2013.01) | |
| G10L 15/30 | (2013.01) | |

(52) U.S. Cl.
CPC ............... *G10L 15/24* (2013.01); *G10L 15/02* (2013.01); *G10L 15/063* (2013.01); *G10L 15/083* (2013.01); *G10L 15/16* (2013.01); *G10L 15/197* (2013.01); *G10L 15/22* (2013.01); *G10L 15/25* (2013.01); *G10L 25/57* (2013.01); *G10L 15/30* (2013.01)

(58) Field of Classification Search
CPC ................................ G10L 15/24; G10L 15/25
See application file for complete search history.

(56) References Cited

U.S. PATENT DOCUMENTS

2017/0061966 A1* 3/2017 Marcheret .............. G06V 20/41

OTHER PUBLICATIONS

Shi, Bowen, et al. "Learning audio-visual speech representation by masked multimodal cluster prediction." arXiv preprint arXiv: 2201.02184 (2022). (Year: 2022).*

(Continued)

*Primary Examiner* — Douglas Godbold
(74) *Attorney, Agent, or Firm* — Honigman LLP; Brett A. Krueger; Grant Griffith

(57) ABSTRACT

A method includes receiving a sequence of acoustic frames and generating, by an audio encoder, at each of a plurality of output steps, an acoustic higher-order feature representation for a corresponding acoustic frame in the sequence of acoustic frames. For each acoustic frame in the sequence of acoustic frames paired with a corresponding video frame, the method includes generating, by an audiovisual encoder, an audiovisual higher-order feature representation for the corresponding acoustic higher-order feature frame and the corresponding video frame; and generating, by a joint network, at an output step, a probability distribution over possible speech recognition hypotheses based on the audiovisual higher-order feature representation. The method, for each corresponding acoustic frame in the sequence of acoustic frames not paired with a corresponding video frame, includes generating, by the joint network, at an output step, a probability distribution over possible speech recognition hypotheses based on the acoustic higher-order feature representation.

21 Claims, 8 Drawing Sheets

(56) References Cited

OTHER PUBLICATIONS

Goh, Yeh-Huann, Kai-Xian Lau, and Yoon-Ket Lee. "Audio-visual speech recognition system using recurrent neural network." 2019 4th International Conference on Information Technology (InCIT). IEEE, 2019. (Year: 2019).*

Petridis, Stavros, et al. "Audio-visual speech recognition with a hybrid ctc/attention architecture." 2018 IEEE Spoken Language Technology Workshop (SLT). IEEE, 2018. (Year: 2018).*

Ma, Pingchuan, Stavros Petridis, and Maja Pantic. "End-to-end audio-visual speech recognition with conformers." ICASSP 2021—2021 IEEE International Conference on Acoustics, Speech and Signal Processing (ICASSP). IEEE, 2021. (Year: 2021).*

International Search Report and Written Opinion issued in related PCT Application No. PCt/US2024/013946, dated Apr. 29, 2024.

Chang, Oscar et al. "On Robustness to Missing Video for Audio-visual Speech Recognition." Trans. Mach. Learn. Res. Aug. 11, 2022 (Aug. 11, 2022), p. 1-32.

Jiadong Wang et al, "Predict-and-Update Network: Audio-Visual Speech Recognition Inspired by Human Speech Perception", arxiv. org, Cornell University Library, 201 Olin Library Cornell University Ithaca, NY 14853, Sep. 5, 2022 (Sep. 5, 2022).

Gong Yuan et al, "UAVM: Towards Unifying Audio and Visual Models", Nov. 24, 2022 (Nov. 24, 2022), vol. {0} 29, p. 2437-2441.

\* cited by examiner

CASCADED AUDIOVISUAL AUTOMATIC SPEECH RECOGNITION MODELS

TECHNICAL FIELD

This disclosure relates to audiovisual automatic speech recognition.

BACKGROUND

Automatic speech recognition (ASR) is an important technology that is increasingly used in mobile devices and other devices. In general, ASR systems provide accurate transcriptions of what a person has said. However, in noisy environments, or when audio quality of a recorded utterance is poor, obtaining accurate ASR results can be difficult. When video of a speaker is available, the video can be leveraged to help improve ASR results. For instance, the video of the speaker may provide information regarding motion of the lips while the speaker is speaking an utterance, and can be combined with audio of the utterance to assist in transcribing the utterance.

SUMMARY

One aspect of the disclosure provides a cascaded audiovisual automatic speech recognition (AV-ASR) model for transcribing speech from audiovisual data. The cascaded AV-ASR model includes an audio encoder, an audiovisual encoder, and a decoder. The audio encoder is configured to receive, as input, a sequence of acoustic frames, and generate, at each of a plurality of output steps, a corresponding acoustic higher-order feature representation for a corresponding acoustic frame in the sequence of acoustic frames. The audiovisual encoder is configured to receive, as input, a sequence of video frames. For each corresponding acoustic frame in the sequence of acoustic frames paired with a corresponding one of the video frames in the sequence of video frames, the audiovisual encoder is configured to receive, as input, the corresponding acoustic higher-order feature representation for the corresponding acoustic frame generated by the audio encoder; and generate a corresponding audiovisual higher-order feature representation for the corresponding acoustic higher-order feature frame and the corresponding one of the video frames in the sequence of video frames. The decoder is configured to, for each corresponding acoustic frame in the sequence of acoustic frames paired with the corresponding one of the video frames in the sequence of video frames, receive, as input, the corresponding audiovisual higher-order feature representation, and, for each corresponding acoustic frame in the sequence of acoustic frames that is not paired with any video frame in the sequence of video frames, receive, as input, the corresponding acoustic higher-order feature representation. The decoder is further configured to generate, at each of the plurality of output steps a probability distribution over possible speech recognition hypotheses.

Implementations of the disclosure may include one or more of the following optional features. In some implementations, the audio encoder includes at least one of a first plurality of multi-head attention layers, a first conformer, or a first plurality of long short term memory (LSTM) layers. The audiovisual encoder may include at least one of a second plurality of multi-head attention layers, a second conformer, or a second plurality of LSTM layers.

In some examples, the audiovisual encoder is configured to generate the corresponding audiovisual higher-order feature representation by: generating, at each of the plurality of output steps, a corresponding visual higher-order feature representation for the corresponding one of the video frames in the sequence of video frames; and fusing the corresponding acoustic higher-order feature representation with the corresponding visual higher-order feature representation. In some implementations, the audiovisual encoder includes concatenation to fuse the corresponding acoustic higher-order feature representation with the corresponding visual higher-order feature representation. In alternative implementations, the audiovisual encoder includes cross-model attention to fuse the corresponding acoustic higher-order feature representation with the corresponding visual higher-order feature representation. In some examples, the cascaded AV-ASR model includes a cascaded audiovisual recurrent neural network-transducer (RNN-T) model architecture.

In some implementations, the decoder includes a prediction network and a joint network. The prediction network is configured to: receive, as input, a sequence of non-blank symbols output by a final softmax layer; and generate, at each of the plurality of output steps, a dense representation. The joint network is configured to: receive, as input, the dense representation generated by the prediction network at each of the plurality of output steps and one of: for each corresponding acoustic frame in the sequence of acoustic frames paired with the corresponding one of the video frames in the sequence of video frames, the corresponding audiovisual higher-order feature representation; or for each corresponding acoustic frame in the sequence of acoustic frames that is not paired with any video frame in the sequence of video frames, the acoustic higher-order feature representation; and generate, at each of the plurality of output steps, a probability distribution over possible speech recognition hypotheses. In some examples, the prediction network includes a two-layer bidirectional long short term memory (LSTM) model; and the joint network includes a multi-layer perceptron model.

In some examples, the audio encoder and the audiovisual encoder are trained jointly. In alternative examples, the cascaded AV-ASR model is trained by: during a first training phase: receiving a first set of training utterances including acoustic frames without corresponding video frames; and training the audio encoder using the first set of training utterances; and, during a second training phase: receiving a second set of training utterances including acoustic frames and corresponding video frames; and training, while holding coefficients of the audio encoder fixed after the first training phase is complete, the audiovisual encoder using the second set of training utterances while the coefficients of the audio encoder are held fixed.

Another aspect of the disclosure provides a computer-implemented method for transcribing speech from audiovisual data that, when executed by data processing hardware, causes the data processing hardware to perform operations. The operations include: receiving a sequence of acoustic frames; and generating, by an audio encoder, at each of a plurality of output steps, a corresponding acoustic higher-order feature representation for a corresponding acoustic frame in the sequence of acoustic frames. The operations further include, for each acoustic frame in the sequence of acoustic frames paired with a corresponding video frame in a sequence of video frames: generating, by an audiovisual encoder, a corresponding audiovisual higher-order feature representation for the corresponding acoustic higher-order feature frame and the corresponding video frame; and generating, by a joint network, at an output step, a probability distribution over possible speech recognition hypotheses based on the corresponding audiovisual higher-order feature representation. The operations also include, for each corresponding acoustic frame in the sequence of acoustic frames not paired with a corresponding video frame, generating, by the joint network, at an output step, a probability distribution over possible speech recognition hypotheses based on the corresponding acoustic higher-order feature representation.

Implementations of the disclosure may include one or more of the following optional features. In some implementations, the audio encoder includes at least one of a first plurality of multi-head attention layers, a first conformer, or a first plurality of long short term memory (LSTM) layers. In some implementations, the audiovisual encoder includes at least one of a second plurality of multi-head attention layers, a second conformer, or a second plurality of LSTM layers.

In some examples, generating the corresponding audiovisual higher-order feature representation includes: generating, at each of the plurality of output steps, a corresponding visual higher-order feature representation for the corresponding one of the video frames in the sequence of video frames; and fusing the corresponding acoustic higher-order feature representation with the corresponding visual higher-order feature representation. In some implementations, fusing the corresponding acoustic higher-order feature representation with the corresponding visual higher-order feature representation includes concatenating the corresponding acoustic higher-order feature representation with the corresponding visual higher-order feature representation. In alternative implementations, fusing the corresponding acoustic higher-order feature representation with the corresponding visual higher-order feature representation includes applying cross-model attention to the corresponding acoustic higher-order feature representation with the corresponding visual higher-order feature representation.

In some implementations, the operations further include: receiving a sequence of non-blank symbols output by a final softmax layer; generating, by a prediction network, based on the sequence of non-blank symbols, at each of the plurality of output steps, a dense representation. The operations also include selecting one of: for each corresponding acoustic frame in the sequence of acoustic frames paired with the corresponding one of the video frames in the sequence of video frames, the corresponding audiovisual higher-order feature representation; or for each corresponding acoustic frame in the sequence of acoustic frames that is not paired with any video frame in the sequence of video frames, the acoustic higher-order feature representation. The operations further include generating, by the joint network, based on the dense representation and the selected one of the corresponding audiovisual higher-order feature representation or the corresponding acoustic higher-order feature representation, at each of the plurality of output steps, a probability distribution over possible speech recognition hypotheses. In some examples, the prediction network includes a two-layer bidirectional long short term memory (LSTM) model; and the joint network includes a multi-layer perceptron model.

In some examples, the audio encoder and the audiovisual encoder are trained jointly. In alternative examples, the operations further include: during a first training phase: receiving a first set of training utterances including acoustic frames without corresponding video frames; and training the audio encoder using the first set of training utterances; and, during a second training phase: receiving a second set of training utterances including acoustic frames and corresponding video frames; and training, while holding coefficients of the audio encoder fixed after the first training phase is complete, the audiovisual encoder using the second set of training utterances while the coefficients of the audio encoder are held fixed.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
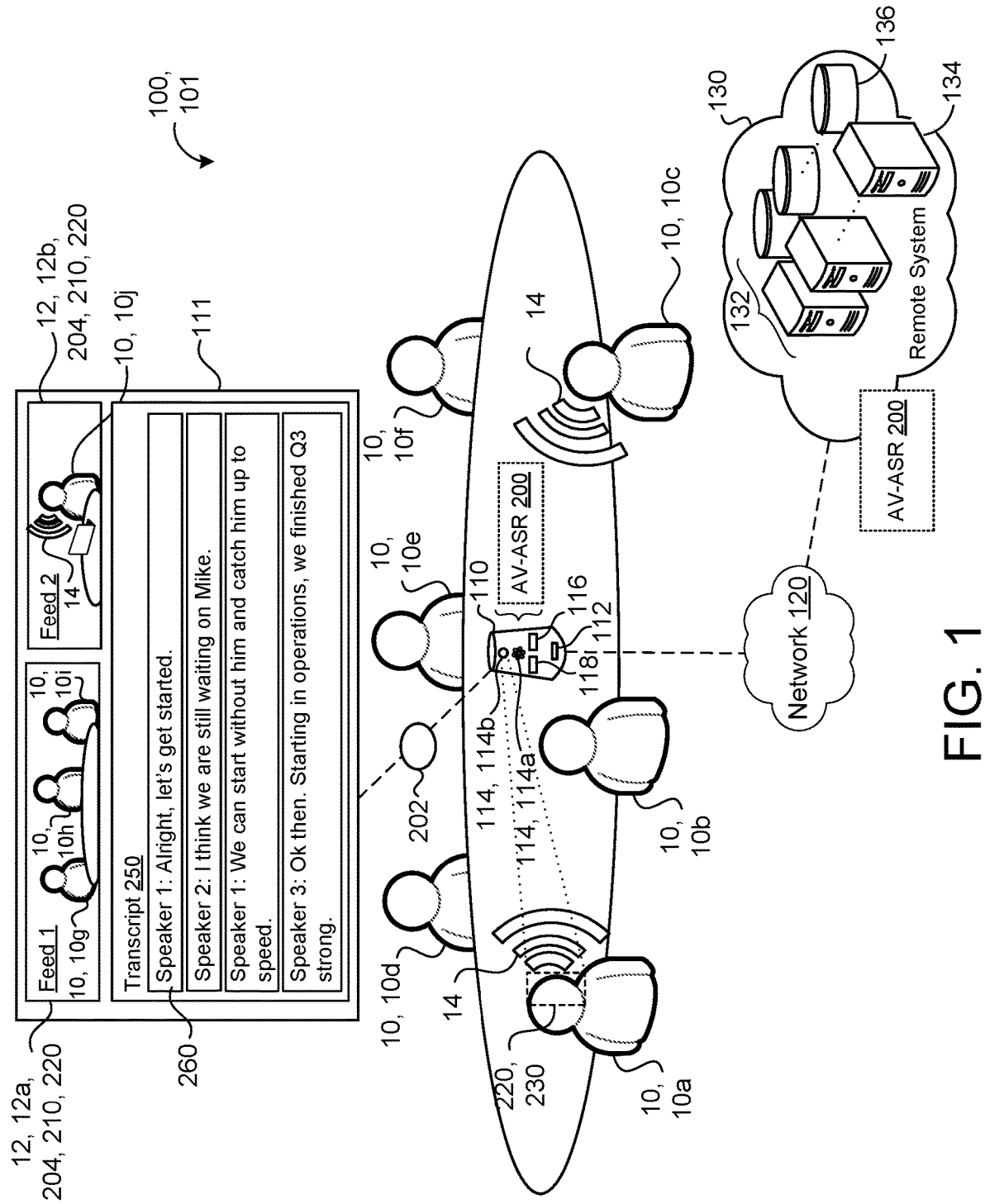
FIG. 1 is a schematic view of an example multi-speaker environment including a cascaded audiovisual automated speech recognition (AV-ASR) model for transcribing speech from audiovisual data.

Automatic speech recognition (ASR) is an important technology that is increasingly used in mobile devices and other devices. In general, ASR systems provide accurate transcriptions of what a person has said. However, in noisy environments, or when audio quality of a recorded utterance is poor, obtaining accurate ASR results can be difficult. When video of a speaker is available, the video can be leveraged to help improve ASR results. For instance, the video of the speaker may provide information regarding motion of the lips while the speaker is speaking an utterance, and can be combined with audio of the utterance to assist in transcribing the utterance.

Learning from multiple modalities (e.g., using audio and video) using large-scale datasets has increasingly been shown to produce more accurate predictions over those learned from a single modality (e.g., only audio). Such approaches have led to state-of-the-art performance on numerous tasks in computer vision, natural language processing, and speech recognition. For example, audiovisual ASR (AV-ASR) models (i.e., ASR models that use both audio data representing an utterance spoken by a speaker and video data representing the face of the speaker while they speak the utterance) have consistently achieved transcription performance superior to audio-only ASR (AO-ASR) models, especially for noisy or overlapping speech. However, it is common for the video of a speaker to be partially or entirely missing in some typical ASR applications like providing closed captions for online meetings. For example, a speaker might move off screen, a camera may be turned off, a speaker may occasionally be occluded by other on-screen objects or changes in lighting conditions, etc. Unfortunately, conventional AV-ASR models perform poorly when video is missing. For example, when video is missing, conventional AV-ASR models may perform worse than a corresponding AO-ASR model.

Implementations herein are directed toward a cascaded AV-ASR model architecture that is robust to missing video. Here, the goal is robustness to missing video, and not missing audio, because current lip-reading models (e.g., video-only ASR models) do not perform well enough for many practical applications of ASR. Notably, while the performance of the cascaded AV-ASR model is improved by the presence of video during training or inference, a lack of video during inference does not degrade the performance of the cascaded AV-ASR model below that of an AO-ASR model. In particular, when video is absent, the cascaded AV-ASR model operates in an acoustic-only mode, and performs the same as an AO-ASR model. But, when video is present, the cascaded AV-ASR model improves ASR performance by fusing acoustic and video information. In disclosed implementations, the cascaded AV-ASR model includes a cascaded encoder and a decoder. The cascaded encoder includes an audiovisual encoder stacked on top of an acoustic encoder. When video is absent, outputs of the acoustic encoder are routed to the decoder model for decoding to generate a transcription of an utterance. However, when video is present, outputs of the acoustic encoder and the video are routed to the audiovisual encoder, and outputs of the audiovisual encoder are router to the decoder model for decoding to generate a transcription of an utterance.

Referring to FIG. 1, in some implementations, an environment 100 includes a plurality of participants 10, 10a-j that are attending a meeting (e.g., a video conference). Here, the environment 100 includes a host meeting room with six participants 10a-f that are attending the meeting (e.g., the video conference) in the host meeting room. The environment 100 includes a system 101 that includes a user device 110, a network 120, and a remote system 130. The user device 110 receives one or more content feeds 12, 12a-n (also referred to as a multi-media feed, a content stream, or a feed) via a network 120 from a remote system 130. In the example shown, the user device 110 receives two feeds 12a, 12b that each correspond to a different remote meeting room. Here, the first feed 12a includes three participants 10, 10g-i participating in the meeting from a remote office, and the second feed 12b includes a single participant 10, 10j participating from a remotely-located residence of the participant 10j. User devices associated with the remote meeting participants 10g-10j may likewise receive feeds 12 of the other meeting locations. Each content feed 12 may correspond to audiovisual data 204 including an audio portion 210 corresponding to an audio track, and a video portion 220 including a video track. As used herein, the terms "audio track" and "audio portion" may be used interchangeably. The video portion 220 may be associated with image data such as video content, video signal, or video stream. Here, the video portion 220 may include video face tracks 230 each associated with faces of one or more of the participants 10a-f. The user device 110 includes, or is in communication with, a display 111 configured to display the video portions 220 of the audiovisual data 204 for the feeds 12. The user device 110 also includes, or is in communication with, an audio speaker 112 configured to audibly output the audio portions 210 of the audiovisual data 204 for the feeds 12.

In addition to receiving audiovisual data 204 from the remote meeting rooms via respective content feeds 12, the user device 110 includes, or is in communication with, one or more peripherals 114, 114a-n for capturing audiovisual data 204 from the host meeting room. For instance, an audio capture device 114, 114a (e.g., an array of one or more microphones) is configured to capture utterances 14 spoken by the participants 10a-f and convert the captured utterances 14 into audio data that corresponds to an audio portion 210 of the audiovisual data 204 for the host meeting room. On the other hand, an image capture device 114, 114b (e.g., one or more cameras) is configured to capture image data that corresponds to a video portion 220 of the audiovisual data 204 for the host meeting room. Here, the video portion 220 may include video face tracks 230 each associated with faces of one or more of the participants 10a-f. In some configurations, the image capture device 114b is configured to capture a 360-degree view about the user device 110 to capture a full view of the host meeting room. For instance, the image capture device 114b may include an array of cameras configured to capture the 360-degree view. While not shown for clarity of illustration, in some instances, the display 111 also displays video portions 220 of the audiovisual data 204 for the host meeting room.

In the example shown, the user device 110 includes data processing hardware 116, and memory hardware 118 in communication with the data processing hardware 116 and storing instructions that, when executed on the data processing hardware 116, cause the data processing hardware 116 to perform operations. The operations may correspond to any of the disclosed methods, models, and processes. In some examples, a face tracker module (not shown for clarity of illustration) executes on the data processing hardware 116 to detect video face tracks 230 in the video portions 220 of the audiovisual data 204. Some examples of the user device 110 include, but are not limited to, a video conference computing device, a computer, a laptop, a tablet, a mobile computing device, a television, a monitor, a smart device (e.g., smart speaker, smart display, and smart appliance), and a wearable device.

The remote system 130 may be a distributed system (e.g., cloud computing environment or storage abstraction) having scalable/elastic resources 132. The resources 132 include computing resources 134 (e.g., data processing hardware) and/or storage resources 136 (e.g. memory hardware). In some implementations, the remote system 130 hosts software that coordinates the environment 100 (e.g., on the computing resources 132). For instance, the computing resources 132 of the remote system 130 may execute software, such as a real-time communication application or a specialty meeting platform. In some examples, a face tracker module executes on the remote system 130 to detect video face tracks 230 in video portions 220 of the audiovisual data 204.

A cascaded audiovisual automated speech recognition (AV-ASR) model 200 processes the audiovisual data 204 to generate a transcription 260 for the audiovisual data 204. Notably, and as described in greater detail below with reference to FIGS. 2A and 2B, the cascaded AV-ASR model 200 includes a cascaded encoder 240 and a decoder 250. The cascaded encoder 240 includes an audiovisual encoder 244 stacked on top of an audio encoder 242. When a portion of audiovisual data 204 that is being transcribed includes a paired video portion 220 having one or more video frames 222 corresponding to one or more acoustic frames 212 of an audio portion 210 of the portion of audiovisual data 204, the audio encoder 242 encodes the acoustic frames 212, the audiovisual encoder 244 encodes the encoded acoustic frames and the video frames 222, and the decoder 250 decodes the encoded audiovisual representation of the acoustic frames 212 and the video frames 222 to generate a transcription 260. However, when the portion of audiovisual data 204 being transcribed does not include a paired video frame corresponding to an acoustic frame 212 of an audio portion 210 of the portion of audiovisual data 204 (i.e., includes the audio portion 210 only), the audio encoder 242 encodes the acoustic frames 212, and the decoder 250 decodes the encoded acoustic representation of the acoustic frames 212 to generate the transcription 260. In this way, when corresponding video frames 222 are not available, the cascaded AV-ASR model 200 operates in a mode similar to an AO-ASR model using the un-paired audio portion 210.

As shown, the display 111 associated with the user device 110 may display the transcription 260 generated by the cascaded AV-ASR model 200. The cascaded AV-ASR model 200 may stream the transcription 260 in real time for output on the display 111 and/or on displays associated with remotely located participants 10g-j. Additionally or alternatively, the transcription 260 may be saved on memory hardware 118, 136 and retrieved at a later time for viewing. The cascaded AV-ASR model 200 may execute on the data processing hardware 116 of the user device 110, thereby enabling the user device 110 to perform on-device speech recognition without the need to perform speech recognition on a server (e.g., remote system 130). On-device speech recognition alleviates the requirement of establishing a network connection with a server, incurring latency due to bandwidth constraints, and also preserve data that a user may not want to share with the server. Moreover, executing the cascaded AV-ASR model 200 on the user device 110 may permit the use of higher fidelity audiovisual data 204 since neither one of the audio portions 210 or the video portions 220 would need to be compressed to satisfy network bandwidth constraints, as may be required if the audiovisual data 204 were sent to a server via a network for processing.

The cascaded AV-ASR model 200 may also execute on the data processing hardware 134 of the remote system 130. For instance, the data processing hardware 134 of the remote system 130 may execute instructions stored on the memory hardware 136 of the remote system 130 for executing disclosed methods, processes and models (e.g., the cascaded AV-ASR model 200). Here, the cascaded AV-ASR model 200 may process the multi-speaker audiovisual data 204 to generate the transcription 260, as discussed above. The remote system 130 may transmit the transcription 260 over the network 120 to the user device 110 for display on the display 111. The remote system 130 may similarly transmit the transcription 260 to computing devices/display devices associated with the participants 10g-i corresponding to the first feed 12a, and/or the participant 10j corresponding to the second feed 12b.

The data processing hardware 134 of the remote system 130 may provide increased processing capabilities that are not achievable on client devices and may have more available memory resources, thereby enabling the use of larger models with more parameters for increased transcription accuracy. In some examples, one or more portions of the cascaded AV-ASR model 200 execute on the user device 110 while one or more other portions of the cascaded AV-ASR model 200 execute on the remote system (e.g., server) 130.

Figure 2A:
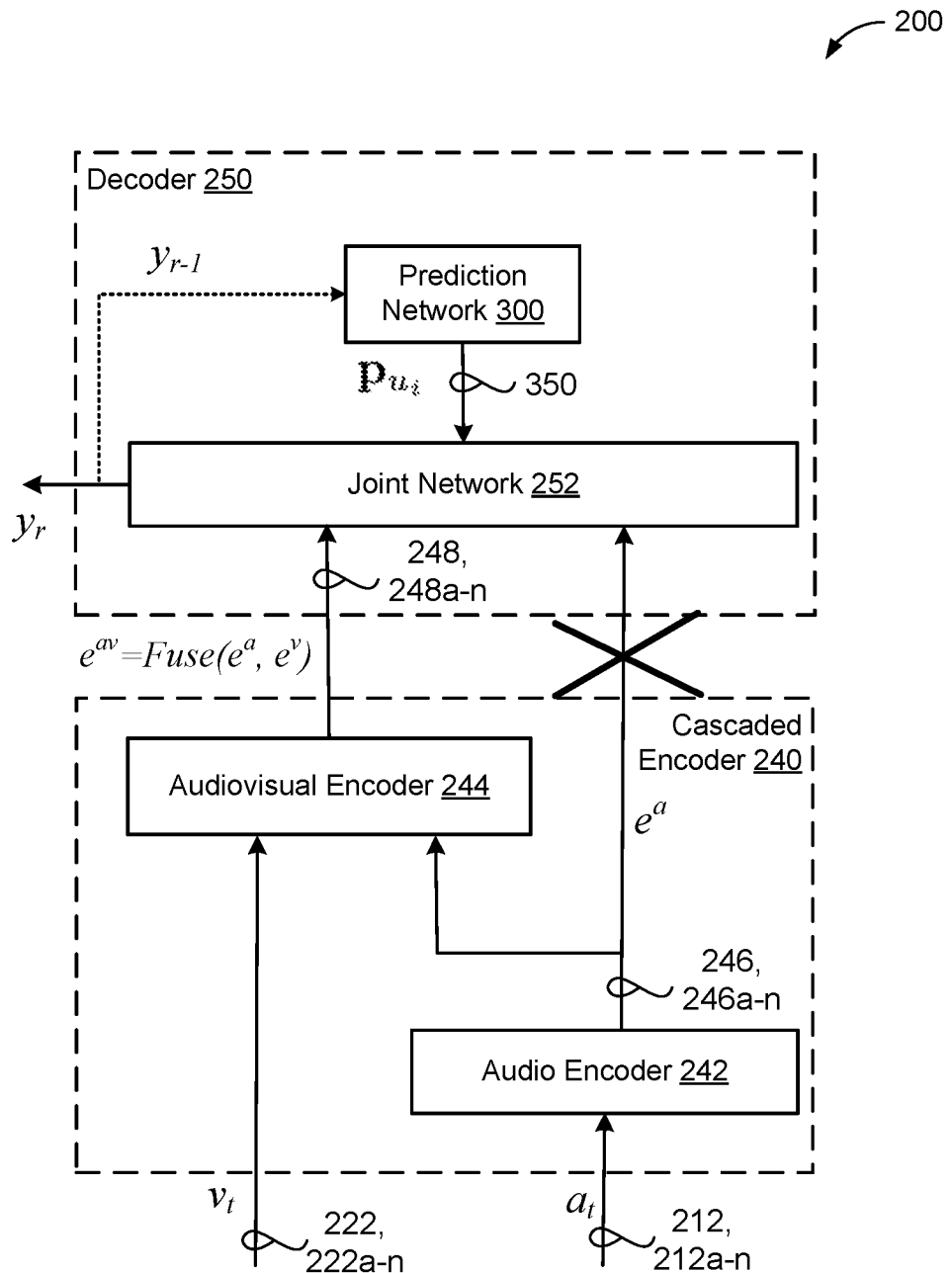
FIG. 2A is a schematic view of the cascaded AV-ASR model operating in an audiovisual mode.
Figure 2B:
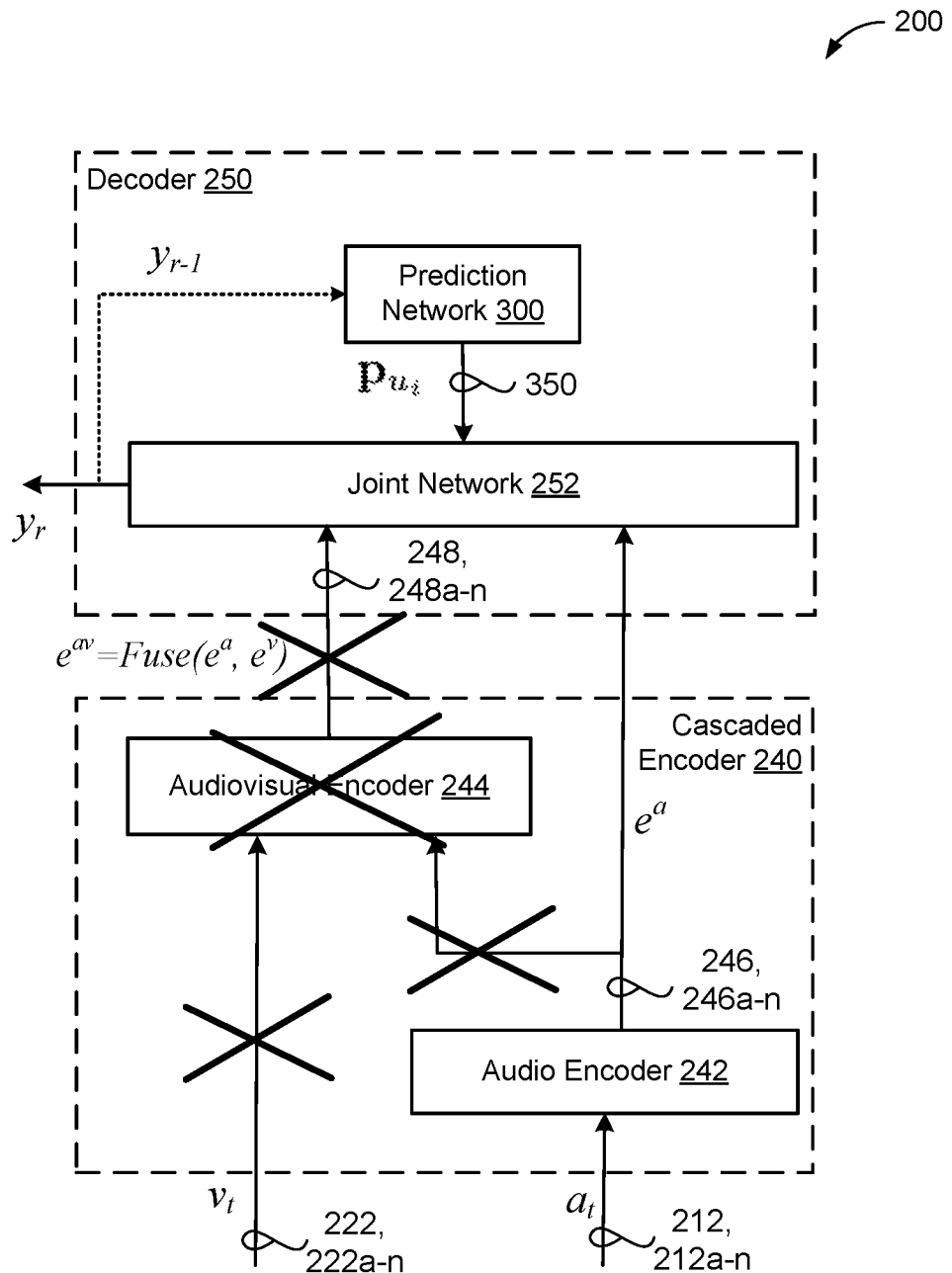
FIG. 2B is a schematic view of the cascaded AV-ASR model operating in an acoustic-only mode.

FIG. 2A is schematic view of the cascaded AV-ASR model 200 while operating in an audiovisual mode. That is, when a portion of audiovisual data 204 that is being transcribed by the cascaded AV-ASR model 200 includes a video portion 220 having one or more video frames 222, 222a-n paired with and corresponding to one or more acoustic frames 212, 212a-n of an audio portion 210 of the portion of audiovisual data 204. Here, paired and corresponding does not require that there is a one-to-one correspondence between video and acoustic frames. For example, some video frames may be dropped (for any reason) such that a video frame corresponds to more than one acoustic frame. FIG. 2B is schematic view of the cascaded AV-ASR model 200 while operating in an acoustic-only (AO) mode. That is, when a portion of audiovisual data 204 that is being transcribed by the cascaded AV-ASR model 200 does not include a paired video frame 222 corresponding to an acoustic frame 212 of the portion of audiovisual data 204. Stated differently, when the portion of the audiovisual data 204 includes unpaired acoustic frames 212 (i.e., no corresponding video frame is available), the AV-ASR model 200 operates in the AO mode.

The example cascaded AV-ASR model 200 includes the cascaded encoder 240 and the decoder 250. The cascaded encoder 240 refers to a model structure where the encoding pathway includes two encoders that can cascade such that the output of one encoder can feed an input of the other encoder prior to decoding. Here, the cascaded encoder 240 includes an audiovisual encoder 244 stacked on top of an audio encoder 242. When operating in audiovisual mode (see FIG. 2A), the audiovisual encoder 244 can improve transcription accuracy of the cascaded AV-ASR model 200 by fusing acoustic higher-order feature representations 246, 246a-n generated by the audio encoder 242 with visual higher-order feature representations generated from the video frames 222 to generate audiovisual higher-order feature representations 248, 248a-n. The decoder 250 then decodes the audiovisual higher-order feature representations 248 to generate transcriptions 260. However, when operating in acoustic-only mode (see FIG. 2B), the audiovisual encoder 244 is bypassed, and the decoder 250 instead decodes the acoustic higher-order feature representations 246 to generate the transcriptions 260. When operating in the acoustic-only mode (see FIG. 2B), the cascaded AV-ASR model 200 operates like, and produces the same predictions as, an AO-ASR model. Thus, the lack of corresponding video frames 222 does not cause a decrease in the transcription accuracy of the cascaded AV-ASR model 200. In some instances, the video frames 222 represent a partial set of the video frames 222 for the video portions 220. For example, video frames 222 may be missing or video portions 220 may be downsampled. In some implementations, the video frames 222 may represent video face tracks 230 corresponding to particular speakers who are detected as speaking. The cascaded AV-ASR model 200 is applicable to streaming and non-streaming speech recognition.

In some implementations, the cascaded AV-ASR model 200 is trained during a single pass such that the audio encoder 242 and the audiovisual encoder 244 are trained jointly. Alternatively, the audio encoder 242 is trained in a first phase, and the audiovisual encoder 244 is trained in a second phase while weights of the audio encoder 242 are held fixed. Such a two phase training process may be used, for example, to teach an arbitrary or pre-existing AO-ASR model to use video frames to increase transcription accuracy. In other words, a pre-trained audio encoder 242 trained on audio-only data for use in a pre-existing AO-ASR model may be incorporated into the AV-ASR model 200, whereby the AV-ASR model 200 is trained by training the audiovisual encoder 244 (and optionally the decoder 250) on audio visual data 204 while parameters/weights of the pre-trained audio encoder 242 are held fixed/frozen.

The audio encoder 242 receives, as input, a sequence of d-dimensional acoustic frames 212 a=$(a_1, a_2, \ldots, a_T)$, where $a_t \in \mathbb{R}^d$ and produces, at each time step, an acoustic higher-order feature representation 246. Here, the acoustic higher-order feature representation 246 is denoted as $e^a$. In the audiovisual mode shown in FIG. 2A, the audiovisual encoder 244 is connected in cascade with the audio encoder 242 and is trained to: receive the acoustic higher-order feature representation $e^a$ 246 as an input; receive, as another input, a sequence of k-dimensional video frames 222 $v=(v_1, v_2, \ldots, v_T)$, where $v_t \in \mathbb{R}^k$; produce, at each time step, a visual higher-order feature representation $e^v$; and fuse the acoustic higher-order feature representation $e^a$ 246 and the visual higher-order feature representation $e^v$ to generate an audiovisual higher-order feature representation 248. Here, the audiovisual higher-order feature representation 248 is denoted as $e^{av}$, where $e^{av}=\text{Fuse}(e^a\ e^v)$, and Fuse( ) represents, for example, concatenation or cross-modal attention. The audiovisual encoder 244 is connected to the decoder 250, and the decoder 250 receives the audiovisual higher-order feature representation $e^{av}$ 248 as input. In the acoustic-only mode shown in FIG. 2B, the audiovisual encoder 244 is bypassed, the audio encoder 242 is connected to the decoder 250, and the decoder 250 instead receives the acoustic higher-order feature representation $e^a$ 246 as input.

The decoder 250 includes a joint network 252 and a prediction network 300. The prediction network 300 may be a long short term memory (LSTM) network, which, like a language model (LM), processes a sequence of non-blank symbols $y_r$ output by a final softmax layer (not shown for clarity of illustration) so far, $y_0, \ldots, y_{ui-1}$, into a representation $p_{u_i}$ 350. As described in greater detail below, the representation $p_{u_i}$ 350 includes a single embedding vector. Notably, a sequence of non-blank symbols $y_r$ received at the prediction network 300 captures linguistic dependencies between non-blank symbols predicted during the previous time steps so far to assist the joint network 252 in predicting the probability of a next output symbol or blank symbol during the current time step. As described in greater detail below, to contribute to techniques for reducing the size of the prediction network 300 without sacrificing accuracy/performance of the cascaded AV-ASR model 200, the prediction network 300 may receive a limited-history sequence of non-blank symbols $y_{ui-n}, \ldots, y_{ui-1}$ that is limited to the N previous non-blank symbols output by the final softmax layer.

Figure 3:
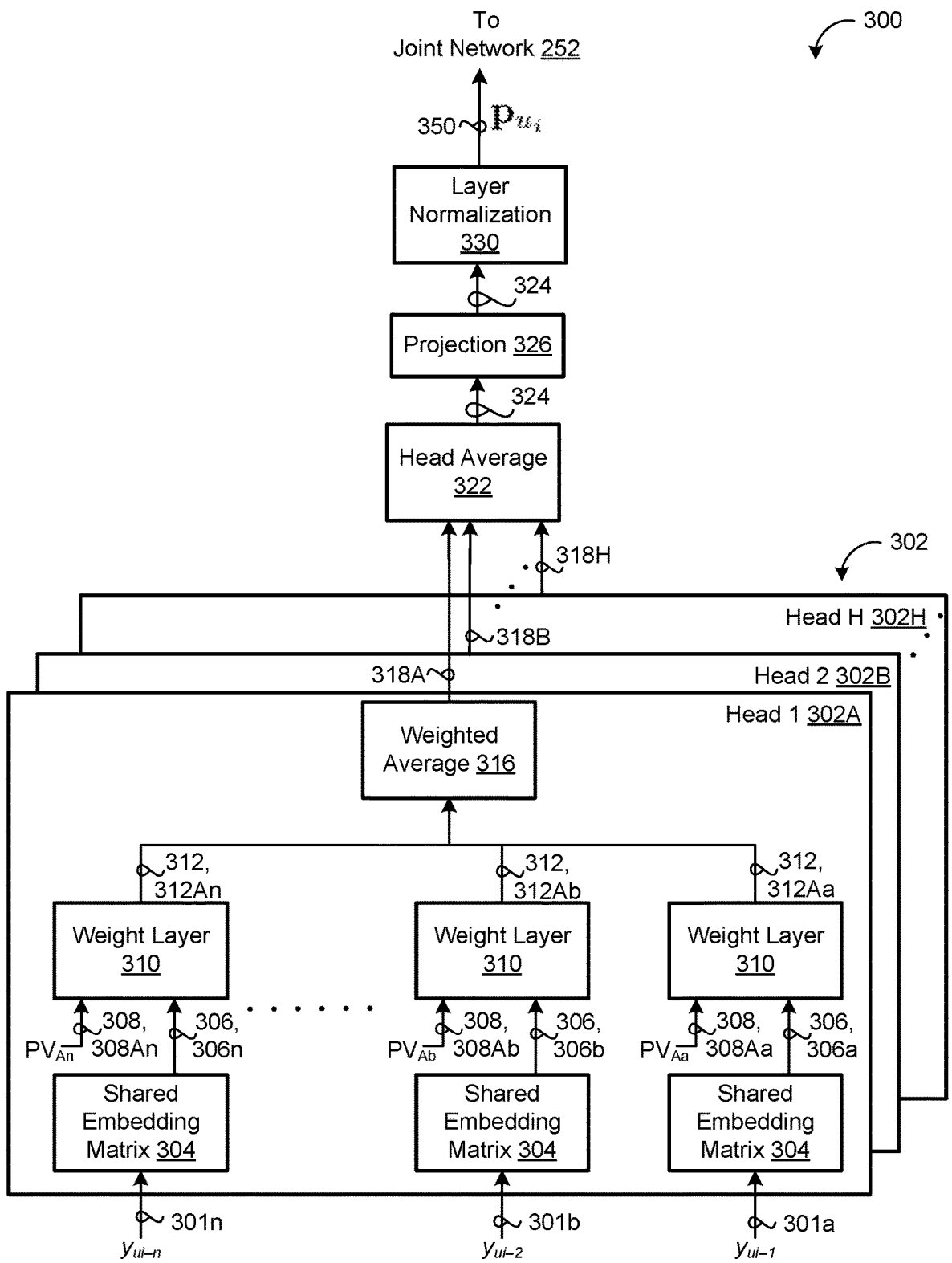
FIG. 3 is a schematic view of an example prediction network.

FIG. 3 shows the prediction network 300 of the cascaded AV-ASR model 200 receiving, as input, a sequence of non-blank symbols $y_{ui-n}, \ldots, y_{ui-1}$ that is limited to the N previous non-blank symbols 301a-n output by the a softmax layer. In some examples, N is equal to two. In other examples, N is equal to five, however, the disclosure is non-limiting and N may equal any integer. The sequence of non-blank symbols 301a-n indicates a speech recognition result (i.e., the transcription 260 of FIG. 1). In some implementations, the prediction network 300 includes a multi-headed attention mechanism 302 that shares a shared embedding matrix 304 across each head 302A-302H of the multi-headed attention mechanism. In one example, the multi-headed attention mechanism 302 includes four heads. However, any number of heads may be employed by the multi-headed attention mechanism 302. Notably, the multi-headed attention mechanism improves performance significantly with minimal increase to model size. As described in greater detail below, each head 302A-H includes its own row of position vectors 308, and rather than incurring an increase in model size by concatenating outputs 318A-H from all the heads, the outputs 318A-H are instead averaged by a head average module 322.

Referring to the first head 302A of the multi-headed attention mechanism 302, the head 302A generates, using the shared embedding matrix 304, a corresponding embedding 306, 306a-n (e.g., $X \in \mathbb{R}^{N \times d_e}$) for each non-blank symbol 301 among the sequence of non-blank symbols $y_{ui-n}, \ldots, y_{ui-1}$ received as input at the corresponding time step from the plurality of time steps. Notably, since the shared embedding matrix 304 is shared across all heads of the multi-headed attention mechanism 302, the other heads 302B-H all generate the same corresponding embeddings 306 for each non-blank symbol. The head 302A also assigns a respective position vector $PV_{Aa-An}$ 308, 308Aa-An (e.g., $P \in \mathbb{R}^{H \times N \times d_e}$) to each corresponding non-blank symbol in the sequence of non-blank symbols $y_{ui-n}, \ldots, y_{ui-1}$. The respective position vector PV 308 assigned to each non-blank symbol indicates a position in the history of the sequence of non-blank symbols (e.g., the N previous non-blank symbols output by the final softmax layer). For instance, the first position vector $PV_{Aa}$ is assigned to a most recent position in the history, while the last position vector $PV_{An}$ is assigned to a last position in the history of the N previous non-blank symbols output by the final softmax layer. Notably, each of the embeddings 306 may include a same dimensionality (i.e., dimension size) as each of the position vectors PV 308.

While the corresponding embedding generated by shared embedding matrix 304 for each for each non-blank symbol 301 among the sequence of non-blank symbols 301a-n, $y_{ui-n}, \ldots, y_{ui-1}$, is the same at all of the heads 302A-H of the multi-headed attention mechanism 302, each head 302A-H defines a different set/row of position vectors 308. For instance, the first head 302A defines the row of position vectors $PV_{Aa-An}$308Aa-An, the second head 302B defines a different row of position vectors $PV_{Ba-Bn}$ 308$_{Ba-Bn}$, ..., and the H$^{th}$ head 302 H defines another different row of position vectors $PV_{Ha-Hn}$308$_{Ha-Hn}$.

For each non-blank symbol in the sequence of non-blank symbols 301a-n received, the first head 302A also weights, via a weight layer 310, the corresponding embedding 306 proportional to a similarity between the corresponding embedding and the respective position vector PV 308 assigned thereto. In some examples, the similarity may include a cosine similarity (e.g., cosine distance). In the example shown, the weight layer 310 outputs a sequence of weighted embeddings 312, 312Aa-An each associated the corresponding embedding 306 weighted proportional to the respective position vector PV 308 assigned thereto. Stated differently, the weighted embeddings 312 output by the weight layer 310 for each embedding 306 may correspond to a dot product between the embedding 306 and the respective position vector PV 308. The weighted embeddings 312 may be interpreted as attending over the embeddings in proportion to how similar they are to the positioned associated with their respective position vectors PV 308. To increase computational speed, the prediction network 300 includes non-recurrent layers, and therefore, the sequence of weighted embeddings 312Aa-An are not concatenated, but instead, averaged by a weighted average module 316 to generate, as output from the first head 302A, a weighted average 318A of the weighted embeddings 312Aa-An represented by.

$$\text{Prediction}(X, P) = \frac{1}{H*N} \sum_{h,n} X_n * \sum_e (X_{n,e} * P_{h,n,e}) \quad (1)$$

In Equation 1, h represents the index of the heads 302, n represents position in context, and e represents the embedding dimension. Additionally, in Equation 1, H, N, and $d_e$ include the sizes of the corresponding dimensions. The position vector PV 308 does not have to be trainable and may include random values. Notably, even though the weighted embeddings 312 are averaged, the position vectors PV 308 can potentially save position history information, alleviating the need to provide recurrent connections at each layer of the prediction network 300.

The operations described above with respect to the first head 302A, are similarly performed by each other head 302B-H of the multi-headed attention mechanism 302. Due to the different set of positioned vectors PV 308 defined by each head 302, the weight layer 310 outputs a sequence of weighted embeddings 312Ba-Bn, 312Ha-Hn at each other head 302B-H that is different than the sequence of weighted embeddings 312Aa-Aa at the first head 302A. Thereafter, the weighted average module 316 generates, as output from each other corresponding head 302B-H, a respective weighted average 318B-H of the corresponding weighted embeddings 312 of the sequence of non-blank symbols.

In the example shown, the prediction network 300 includes a head average module 322 that averages the weighted averages 318A-H output from the corresponding heads 302A-H. A projection layer 326 with swish activation may receive, as input, an output 324 from the head average module 322 that corresponds to the average of the weighted averages 318A-H, and generate, as output, a projected output 328. A final layer normalization 330 may normalize the projected output 328 to provide the single embedding vector $Pu_i$ 350 at the corresponding time step from the plurality of time steps. The prediction network 300 generates only a single embedding vector $Pu_i$ 350 at each of the plurality of time steps subsequent to an initial time step.

In some configurations, the prediction network 300 does not implement the multi-headed attention mechanism 302 and only performs the operations described above with respect to the first head 302A. In these configurations, the weighted average 318A of the weighted embeddings 312Aa-An is simply passed through the projection layer 326 and layer normalization 330 to provide the single embedding vector $Pu_i$ 350.

Referring back to FIGS. 2A and 2B, the joint network 252 combines the representations produced by the cascaded encoder 240 and the prediction network 300. In the audio-visual mode shown in FIG. 2A, the joint network 252 receives, as input x, the audiovisual higher-order feature representation $e^{av}$ 248, and process the input x to produce a joint network output. In the acoustic-only mode shown in FIG. 2B, the joint network 252 instead receives, as the input x, the acoustic higher-order feature representation $e^a$ 246, and process the input x to produce the joint network output. The joint network output can be a probability distribution, $P(y_i|y_{i-1}, \ldots, y_0, x)$, over the current sub-word unit, $y_i$, given the sequence of the N previous non-blank symbols previous units, $\{y_{i-1}, \ldots, y_{i-N}\}$, and the input x.

The joint network 252 is configured to generate, at each output step, a probability distribution over possible speech recognition hypotheses. Stated differently, the joint network 252 generates, at each output step (e.g., time step), a probability distribution over possible speech recognition hypotheses. Here, the "possible speech recognition hypotheses" correspond to a set of output labels/symbols (also referred to as "speech units") each representing a grapheme (e.g., symbol/character) or a word piece in a specified natural language. For example, when the natural language is English, the set of output labels may include twenty-seven (27) symbols, e.g., one label for each of the 26-letters in the English alphabet and one label designating a space. Accordingly, the joint network 252 may output a set of values indicative of the likelihood of occurrence of each of a predetermined set of output labels. This set of values can be a vector (e.g., a one-hot vector) and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output labels could also be other types of speech units, such as phonemes or sub-phonemes. The output distribution of the joint network 252 can include an aposteriori probability value for each of the different output labels. Thus, if there are 100 different output labels representing different graphemes or other symbols, the output of the joint network 252 can include 100 different probability values, one for each output label. The probability distribution can then be used to select and assign scores to candidate orthographic elements (e.g., graphemes, wordpieces, and/or words) in a beam search process (e.g., by the softmax layer) for determining the transcription 260.

In some implementations, to further reduce the size of the decoder 250, i.e., the prediction network 300 and the joint network 252, parameter tying between the prediction network 300 and the joint network 252 is applied. Specifically, for a vocabulary size $|V|$ and an embedding dimension $d_e$, the shared embedding matrix 304 at the prediction network 300 is $E \in \mathbb{R}^{|V| \times d_e}$. Meanwhile, a last hidden layer includes a dimension size $d_h$ at the joint network 252, feed-forward projection weights from the hidden layer to the output logits will be $W \in \mathbb{R}^{d_h \times |V+1|}$, with an extra blank token in the vocabulary. Accordingly, the feed-forward layer corresponding to the last layer of the joint network 252 includes a weight matrix $[d_h, |V|]$. By having the prediction network 300 to tie the size of the embedding dimension $d_e$ to the dimensionality $d_h$ of the last hidden layer of the joint network 252, the feed-forward projection weights of the joint network 252 and the shared embedding matrix 304 of the prediction network 300 can share their weights for all non-blank symbols via a simple transpose transformation. Since the two matrices share all their values, the decoder 250 only needs to store the values once on memory, instead of storing two individual matrices. By setting the size of the embedding dimension $d_e$ equal to the size of the hidden layer dimension $d_h$, the decoder 250 reduces a number of parameters equal to the product of the embedding dimension $d_e$ and the vocabulary size $|V|$. This weight tying corresponds to a regularization technique.

The softmax layer may employ any technique to select the output label/symbol with the highest probability in the distribution as the next output symbol predicted by the cascaded AV-ASR model 200 at the corresponding output step. In this manner, the cascaded AV-ASR model 200 does not make a conditional independence assumption, rather the prediction of each symbol is conditioned not only on the acoustic and video frames but also on the sequence of labels output so far. The cascaded AV-ASR model 200 does assume an output symbol is independent of future acoustic and video frames 222, which allows the cascaded AV-ASR model 200 to be employed in a streaming fashion. In some implementations, the softmax layer is separate from the decoder 250 and processes the output from the decoder 250. The output of the softmax layer is then used in a beam search process to select orthographic elements. In some implementations, the softmax layer is integrated with the decoder 250, such that the output of the decoder 250 represents the output of the softmax layer.

In some implementations, the cascaded AV-ASR model 200 includes an audiovisual recurrent neural network-transducer (RNN-T) model architecture. In some examples, the audio encoder 242 includes a plurality of multi-head attention layers, a conformer having a plurality of conformer layers (e.g., 17 conformer layers), or a long short term memory (LSTM) model having a plurality of LSTM layers (e.g., 8 LSTM layers). In some examples, the audiovisual encoder 244 includes a plurality of multi-head attention layers, a conformer, or an LSTM model. Here, the conformer may include 17 layers, full context attention, a model dimension of 512, 8 attention heads, a convolutional kernel size of 32, no dropout, and group normalization with 32 groups in place of layer normalization. Here, the LSTM model may include 8 bi-directional layers, a model dimension of 512 for each direction, and weight normalization. The types of audio encoders 242 and audiovisual encoders 244 may be combined in various ways. For example, the encoders 242, 244 may both be conformers, the encoders 242, 244 may both be LSTM models, a conformer-based audio encoder 242 may be used with an LSTM-based audiovisual encoder 244, or an LSTM-based audio encoder 242 may be used with a conformer-based audiovisual encoder 244. In some implementations, the audiovisual encoder 244 includes concatenation to fuse acoustic higher-order feature representations $e^a$ 246 and visual higher-order feature representations $e^v$. Alternatively, the audiovisual encoder 244 includes cross-modal attention to fuse acoustic higher-order feature representations $e^a$ 246 and visual higher-order feature representations $e^v$. In some examples, the decoder 250 includes a two-layer bidirectional LSTM model with a hidden dimension of 2048, an embedding dimension of 128, and a beam width of size 8; and the joint network 252 includes a multilayer perceptron (MLP) with a hidden dimension of 640.

Within the decoder 250, the prediction network 300 may have two 2,048-dimensional LSTM layers, each of which is also followed by a 640-dimensional projection layer. In other configurations, the prediction network 300 may instead include conformer or transformer layers in lieu of LSTM layers. In yet other configurations, the prediction network 300 includes a V2 embedding look up table that includes an embedding prediction network. At each time step, the V2 embedding lookup table may receive, as input, the previous two predictions (e.g., 1-hot vectors) output by the joint network 252, compute a respective embedding $d_1$, $d_2$ for each of the previous two predictions, and provide a concatenated output $[d_1, d_2]$ to the joint network 252. Comparatively, the V2 embedding lookup table may have only about two (2) million parameters, whereas an LSTM-based prediction network may include about 23.4 million parameters. Finally, the joint network 252 may also be a one-layer neural network with 640 hidden units. The softmax layer may be composed of a unified word piece or grapheme set that is generated using all unique word pieces or graphemes in a plurality of training data sets.

Figure 4A:
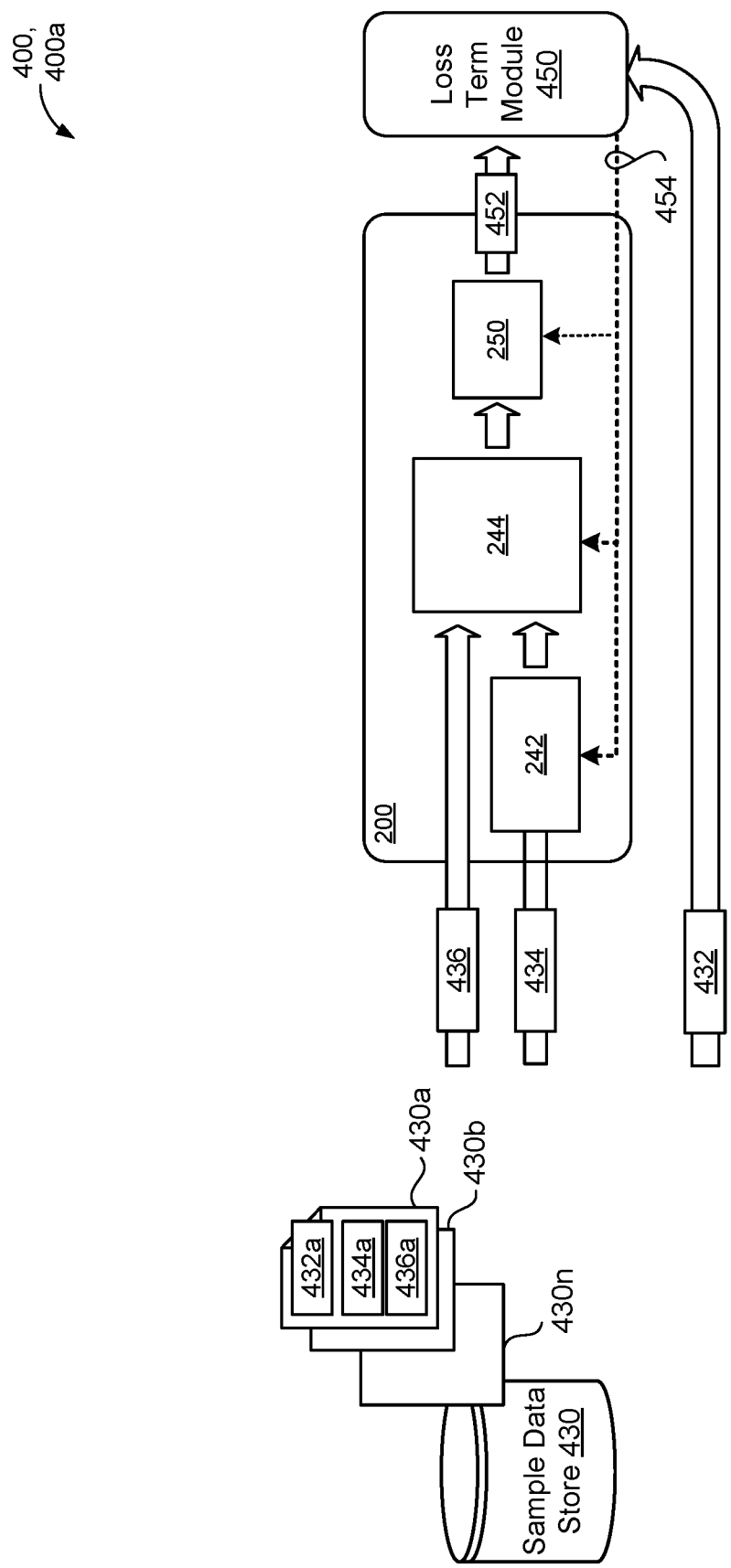
FIGS. 4A and 4B are schematic views of example training processes for training the cascaded AV-ASR model.

FIG. 4A is a schematic view of an example training process 400, 400*a* for training the cascaded AV-ASR model 200. Here, the example training process 400*a* jointly trains the audio encoder 242 and the audiovisual encoder 244. The training process 400*a* may also train the decoder 250. The training process 400*a* may execute on the remote system 130 (i.e., on the data processing hardware 134 or on the user device 110 (i.e., on the data processing hardware 116).

For each audiovisual training sample 430, 430*a-n* in a set of audiovisual trainings samples 430, the training process 400*a* processes, using the cascaded AV-ASR model 200 operating in the audiovisual mode (see FIG. 2A), acoustic frames 434 of an audio portion of the training sample 430 and corresponding paired video frames 436 of a video portion of the training sample 430 to obtain one or more speech recognition hypotheses 452 for the training sample 430.

Thereafter, for each training sample 430, a loss term module 450 receives the one or more speech recognition hypotheses 452 output by the cascaded AV-ASR model 200 for the training sample 430, and determines a log loss term $\mathcal{L}_{\ell\ell}$ 454 based on the predicted speech recognition hypotheses 452 and a corresponding ground-truth transcription y* 432 for the training sample 430. However, other loss terms, such as minimum word error rate or an RNN-T loss, may be used. Here, the log loss term $\mathcal{L}_{\ell\ell}$ 454 is the negative of the log of the probability Pr(y*|x) determined by the joint network 252 for the ground-truth transcription y* 432. Based on the log loss term $\mathcal{L}_{\ell\ell}$ 454 output by the loss term module 450 for each training sample 430, the training process 400*a* trains/updates parameters/weights/coefficients of the cascaded AV-ASR model 200 to minimize log loss term $\mathcal{L}_{\ell\ell}$ 454. Parameters/weights/coefficients of the decoder 250 may also be trained/updated using the log loss term 454. By reducing this log loss metric $\mathcal{L}_{ll}$ 454, the training process 400*a* trains the cascaded AV-ASR model 200 to increase the probabilities for the set of ground truth transcriptions 432 conditioned on corresponding input acoustic frames 434 and the paired corresponding input video frames 436 as the input x.

Figure 4B:
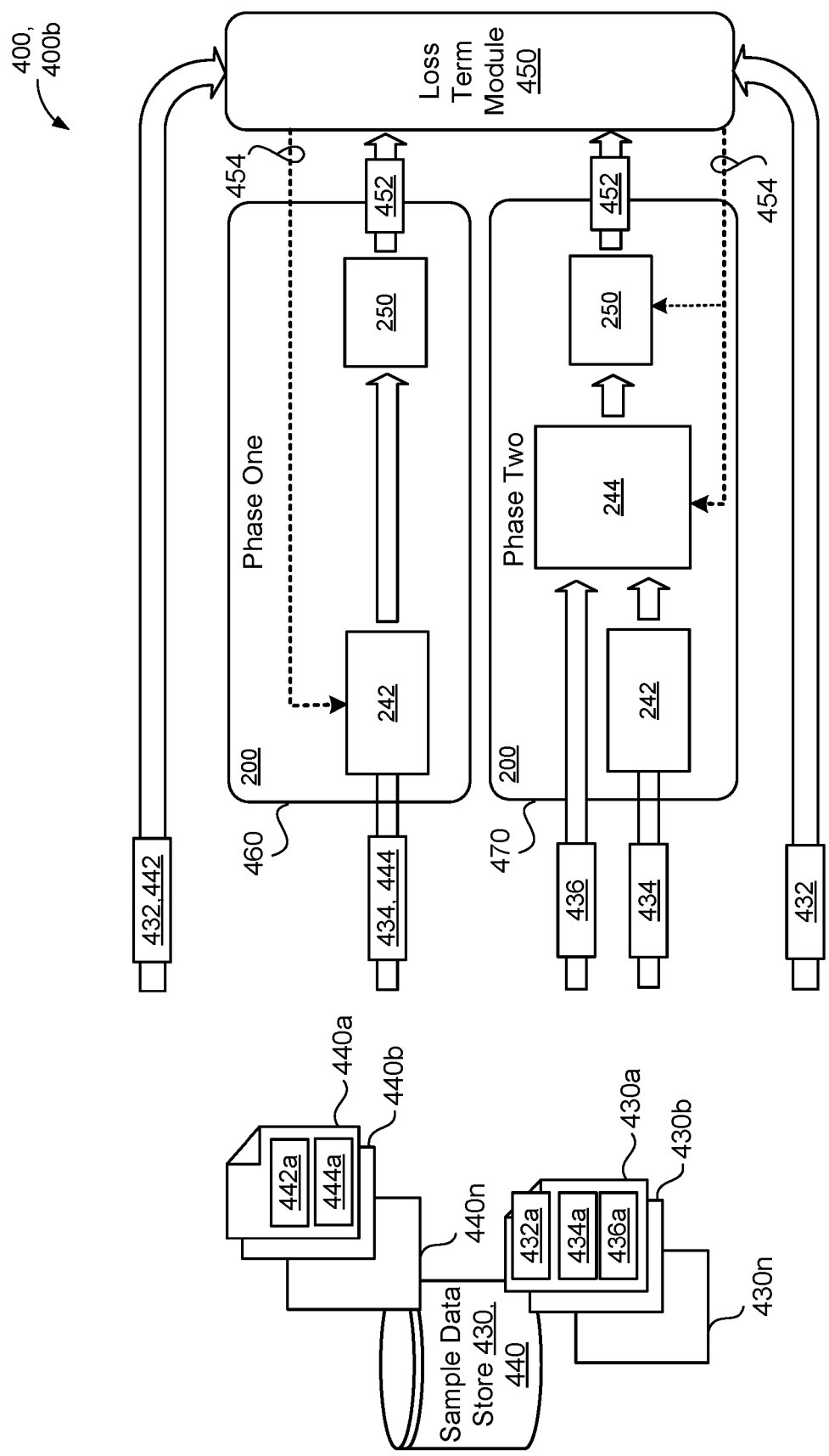

FIG. 4B is a schematic view of another example training process 400, 400*b* for training the cascaded AV-ASR model 200. The example training process 400*b* is a two-stage training process that separately trains the audio encoder 242 and the audiovisual encoder 244. The training process 400*b* may also train the decoder 250. The training process 400*b* may execute on the remote system 130 (i.e., on the data processing hardware 134 or on the user device 110 (i.e., on the data processing hardware 116). The training process 400*b* may train the AV-ASR model 200 on a set of audiovisual training samples 430, 430*a-n* that each include a ground-truth transcription 432, a sequence of acoustic frames 434, and corresponding paired video frames 436. The training process 400*b* may also train the AV-ASR model 200 on a set of audio-only training samples 440, 440*a-n* that each include a ground-truth transcription 442 and a sequence of acoustic frames 444 not paired with any corresponding video frames.

In a first training phase 460, for each audiovisual training sample 430 and each audio-only training sample 440, the training process 400*b* processes, using the cascaded AV-ASR model 200 operating in the AO mode (see FIG. 2B), the corresponding acoustic frames 434, 444 of an audio portion of the training sample 430, 440 to obtain one or more speech recognition hypotheses 452 for the acoustic training sample 430, 440. Here, the acoustic training samples 430 may be formed by only using the acoustic frames 434 of the audiovisual training samples 430.

Thereafter, for each training sample 430, 440, the loss term module 450 receives the one or more speech recognition hypotheses 452 output by the cascaded AV-ASR model 200 for the training sample 430, 440, and determines the log loss term $\mathcal{L}_{\ell\ell}$ 454 based on the predicted speech recognition hypotheses 452 and a corresponding ground-truth transcription y* 432, 442 for the training sample 430, 440. However, other loss terms, such as minimum word error rate or an RNN-T loss, may be used. Here, the log loss term $\mathcal{L}_{\ell\ell}$ 454 is the negative of the log of the probability Pr(y*|x) determined by the joint network 252 for the ground-truth transcription y* 432, 442. Based on the log loss term $\mathcal{L}_{\ell\ell}$ 454 output by the loss term module 450 for each training sample 430, 440, the training process 400b trains/updates parameters/weights/coefficients of the audio encoder 242 to minimize the log loss term $\mathcal{L}_{\ell\ell}$ 454. Parameters/weights/coefficients of the decoder 250 may also be trained/updated using the log loss term 454. By reducing this log loss metric $\mathcal{L}_{ll}$ 454, the training process 400b trains the audio encoder 242 to increase the probabilities for the set of ground truth transcriptions 432, 442 conditioned on corresponding input acoustic frames 444 as the input x.

In a second training phase 470, for each audiovisual training sample 430, 430a-n in the set of audiovisual trainings samples 430, the training process 400b processes, using the cascaded AV-ASR model 200 operating in the audiovisual mode (see FIG. 2A), acoustic frames 434 of an audio portion of the training sample 430 and corresponding paired video frames 436 of a video portion of the training sample 430 to obtain one or more speech recognition hypotheses 452 for the training sample 430.

Thereafter, for each training sample 430, a loss term module 450 receives the one or more speech recognition hypotheses 452 output by the cascaded AV-ASR model 200 for the training sample 430, and determines a log loss term $\mathcal{L}_{\ell\ell}$ 454 based on the predicted speech recognition hypotheses 452 and a corresponding ground-truth transcription y* 432 for the training sample 430. However, other loss terms, such as minimum word error rate or an RNN-T loss, may be used. Here, the log loss term $\mathcal{L}_{\ell\ell}$ 454 is the negative of the log of the probability Pr(y*|x) determined by the joint network 252 for the ground-truth transcription y* 432. Based on the log loss term $\mathcal{L}_{\ell\ell}$ 454 output by the loss term module 450 for each training sample 430, the training process 400b trains/updates parameters/weights/coefficients of the audiovisual encoder 244 to minimize log loss term $\mathcal{L}_{\ell\ell}$ 454. Parameters/weights/coefficients of the decoder 250 may also be trained/updated using the log loss term 454. However, other loss terms, such as minimum word error rate or an RNN-T loss, may be used. Notably, coefficients/parameters/weights of the audio encoder 242 are held fixed while the coefficients/parameters/weights of the audiovisual encoder 244 are updated during the second training phase 470. By reducing this log loss metric $\mathcal{L}_{ll}$ 454, the training process 400b trains the cascaded AV-ASR model 200 to increase the probabilities for the set of ground truth transcriptions 432 conditioned on corresponding input acoustic frames 434 and the paired corresponding input video frames 436 as the input x. Notably, because the parts of the cascaded AV-ASR model 200 that activate when the cascaded AV-ASR model 200 sees acoustic-only data are frozen, the cascaded AV-ASR model 200 is guaranteed to never perform worse than its acoustic-only baseline from first training phase 460.

Figure 5:
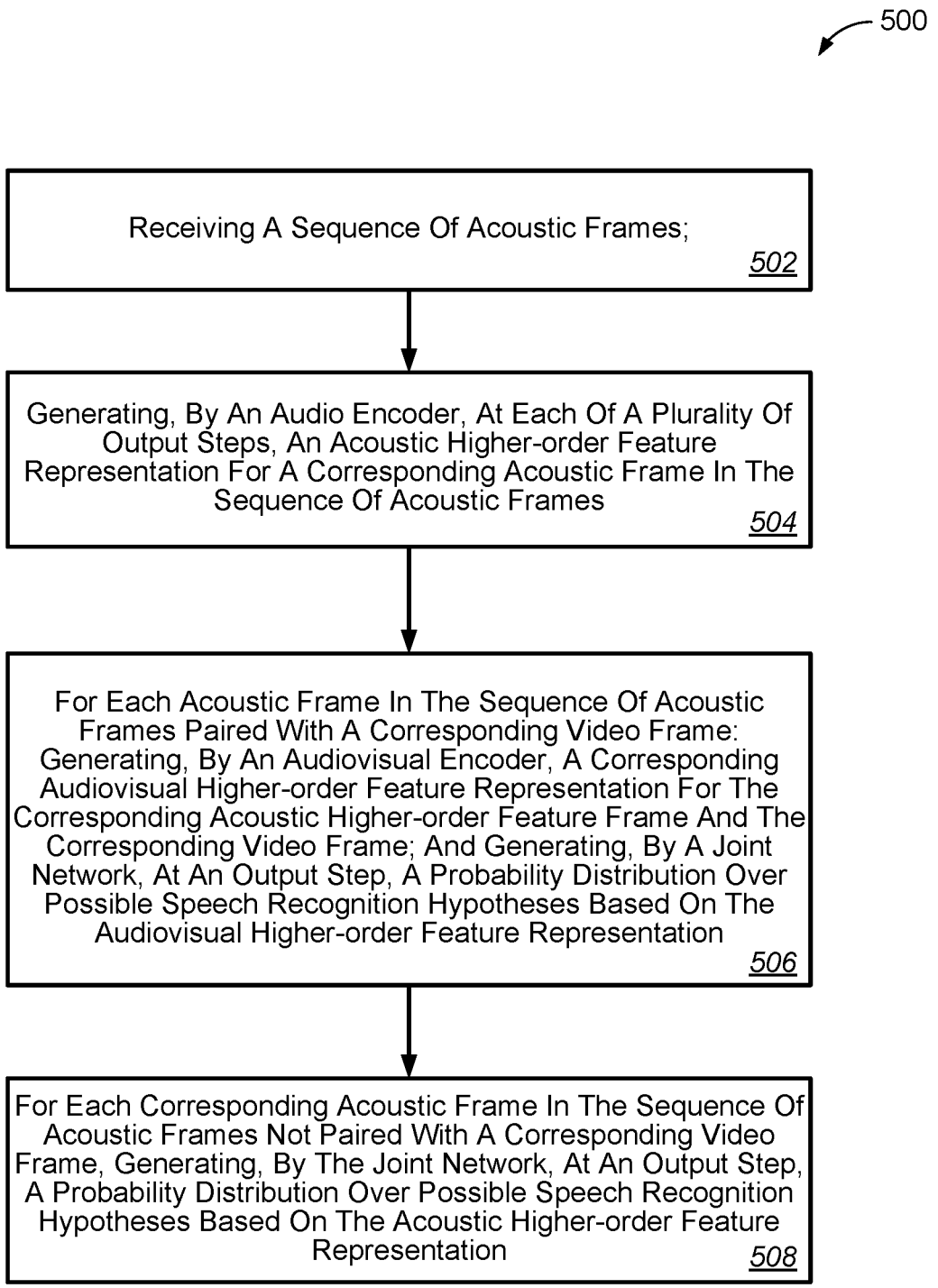
FIG. 5 is an example arrangement of operations for a method of transcribing speech from audiovisual data using the cascaded AV-ASR model.

FIG. 5 provides a flowchart of an example arrangement of operations for a method 500 of using the cascaded AV-ASR model 200 to transcribe speech from audiovisual data 204. The cascaded AV-ASR model 200 and the operations for the method 500 may execute on the data processing hardware 116 of the user device 110 of FIG. 1, the data processing hardware 134 of the remote system (e.g., distributed system) 130 of FIG. 1, or a combination thereof.

The method 500 includes at operation 502, receiving a sequence of acoustic frames 212. At operation 504, the method 500 includes generating, by an audio encoder 242, at each of a plurality of output steps, an acoustic higher-order feature representation $e^a$ 246 for a corresponding acoustic frame 212 in the sequence of acoustic frames 212.

At operation 506, the method 500 includes, for each acoustic frame 212 in the sequence of acoustic frames 212 paired with a corresponding video frame 222: generating, by an audiovisual encoder 244, a corresponding audiovisual higher-order feature representation $e^{av}$ 248 for the corresponding acoustic higher-order feature representation $e^a$ 246 and the corresponding paired video frame 222; and generating, by a joint network 252, at an output step, a probability distribution over possible speech recognition hypotheses based on the audiovisual higher-order feature representation $e^{av}$ 248.

At operation 508, the method 500 includes, for each corresponding acoustic frame 212 in the sequence of acoustic frames 212 not paired with a corresponding video frame 222, generating, by the joint network 252, at an output step, a probability distribution over possible speech recognition hypotheses based on the acoustic higher-order feature representation $e^a$ 246.

Figure 6:
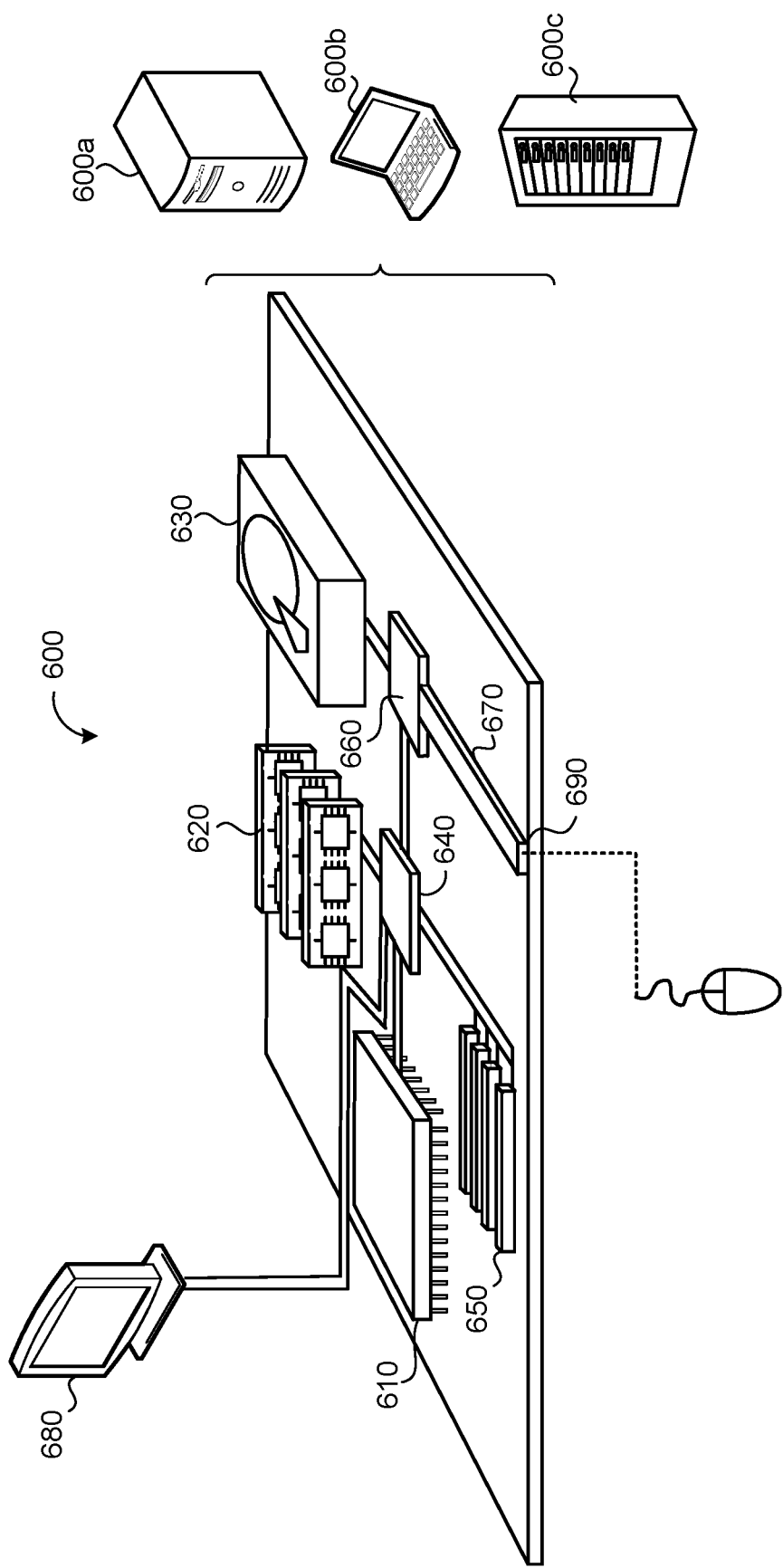
FIG. 6 is a schematic view of an example computing device that may be used to implement the systems, models, processes, and methods described herein.

FIG. 6 is schematic view of an example computing device 600 that may be used to implement the systems, models, processes, and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the disclosures described and/or claimed in this document.

The computing device 600 includes a processor 610 (i.e., data processing hardware) that can be used to implement the data processing hardware 116 and 134), memory 620 (i.e., memory hardware) that can be used to implement the memory hardware 118 and 136), a storage device 630 (i.e., memory hardware) that can be used to implement the memory hardware 118 and 136 and the data store 420, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 (e.g., data processing hardware 116, 134 of FIG. 1) can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 (e.g., memory hardware 118, 136 of FIG. 1) stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. The programs may, when executed by data processing hardware, cause the data processing hardware to implement any of the methods, models, and processes disclosed herein. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600*a* or multiple times in a group of such servers 600*a*, as a laptop computer 600*b*, or as part of a rack server system 600*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, the phrase "at least one of A, B, or C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least C; and (7) at least one A with at least one B and at least one C. Moreover, unless expressly stated to the contrary, the phrase "at least one of A, B, and C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least one C; and (7) at least one A with at least one B and at least one C. Furthermore, unless expressly stated to the contrary, "A or B" is intended to refer to any combination of A and B, such as: (1) A alone; (2) B alone; and (3) A and B.

A number of implementations have been described. Nevertheless, it will be understood that various modifications may be made without departing from the spirit and scope of the disclosure. Accordingly, other implementations are within the scope of the following claims.

What is claimed is:

1. A cascaded audiovisual automated speech recognition (AV-ASR) model comprising:
   an audio encoder configured to:
      receive, as input, a sequence of acoustic frames; and
      generate, at each of a plurality of output steps, a corresponding acoustic higher-order feature representation for a corresponding acoustic frame in the sequence of acoustic frames;
   an audiovisual encoder configured to:
      receive, as input, a sequence of video frames; and
      for each corresponding acoustic frame in the sequence of acoustic frames paired with a corresponding one of the video frames in the sequence of video frames:
         receive, as input, the corresponding acoustic higher-order feature representation for the corresponding acoustic frame generated by the audio encoder; and
         generate a corresponding audiovisual higher-order feature representation for the corresponding acoustic higher-order feature frame and the corresponding one of the video frames in the sequence of video frames; and
   a decoder configured to:
      for each corresponding acoustic frame in the sequence of acoustic frames paired with the corresponding one of the video frames in the sequence of video frames, receive, as input, the corresponding audiovisual higher-order feature representation;
      for each corresponding acoustic frame in the sequence of acoustic frames that is not paired with any video frame in the sequence of video frames, receive, as input, the corresponding acoustic higher-order feature representation; and
      generate, at each of the plurality of output steps a probability distribution over possible speech recognition hypotheses.

2. The cascaded AV-ASR model of claim 1, wherein the audio encoder comprises at least one of a first plurality of multi-head attention layers, a first conformer, or a first plurality of long short term memory (LSTM) layers.

3. The cascaded AV-ASR model of claim 2, wherein the audiovisual encoder comprises at least one of a second plurality of multi-head attention layers, a second conformer, or a second plurality of LSTM layers.

4. The cascaded AV-ASR model of claim 1, wherein the audiovisual encoder is configured to generate the corresponding audiovisual higher-order feature representation by:
   generating, at each of the plurality of output steps, a corresponding visual higher-order feature representation for the corresponding one of the video frames in the sequence of video frames; and
   fusing the corresponding acoustic higher-order feature representation with the corresponding visual higher-order feature representation.

5. The cascaded AV-ASR model of claim 4, wherein the audiovisual encoder comprises concatenation to fuse the corresponding acoustic higher-order feature representation with the corresponding visual higher-order feature representation.

6. The cascaded AV-ASR model of claim 4, wherein the audiovisual encoder comprises cross-model attention to fuse the corresponding acoustic higher-order feature representation with the corresponding visual higher-order feature representation.

7. The cascaded AV-ASR model of claim 1, wherein the cascaded AV-ASR model comprises a cascaded audiovisual recurrent neural network-transducer (RNN-T) model architecture.

8. The cascaded AV-ASR model of claim 1, wherein the decoder comprises:
   a prediction network configured to:
      receive, as input, a sequence of non-blank symbols output by a final softmax layer; and
      generate, at each of the plurality of output steps, a dense representation; and
   a joint network configured to:
      receive, as input, the dense representation generated by the prediction network at each of the plurality of output steps and one of:
         for each corresponding acoustic frame in the sequence of acoustic frames paired with the corresponding one of the video frames in the sequence of video frames, the corresponding audiovisual higher-order feature representation; or
         for each corresponding acoustic frame in the sequence of acoustic frames that is not paired with any video frame in the sequence of video frames, the acoustic higher-order feature representation; and
      generate, at each of the plurality of output steps, a probability distribution over possible speech recognition hypotheses.

9. The cascaded AV-ASR model of claim 8, wherein:
the prediction network comprises a two-layer bidirectional long short term memory (LSTM) model; and
the joint network comprises a multi-layer perceptron model.

10. The cascaded AV-ASR model of claim 1, wherein the audio encoder and the audiovisual encoder are trained jointly.

11. The cascaded AV-ASR model of claim 1, wherein the cascaded AV-ASR model is trained by:
during a first training phase:
receiving a first set of training utterances comprising acoustic frames without corresponding video frames; and
training the audio encoder using the first set of training utterances; and
during a second training phase:
receiving a second set of training utterances comprising acoustic frames and corresponding video frames; and
training, while holding coefficients of the audio encoder fixed after the first training phase is complete, the audiovisual encoder using the second set of training utterances while the coefficients of the audio encoder are held fixed.

12. A computer-implemented method executed on data processing hardware that causes the data processing hardware to perform operations comprising:
receiving a sequence of acoustic frames;
generating, by an audio encoder, at each of a plurality of output steps, a corresponding acoustic higher-order feature representation for a corresponding acoustic frame in the sequence of acoustic frames;
for each acoustic frame in the sequence of acoustic frames paired with a corresponding video frame in a sequence of video frames:
generating, by an audiovisual encoder, a corresponding audiovisual higher-order feature representation for the corresponding acoustic higher-order feature frame and the corresponding video frame; and
generating, by a joint network, at an output step, a probability distribution over possible speech recognition hypotheses based on the corresponding audiovisual higher-order feature representation; and
for each corresponding acoustic frame in the sequence of acoustic frames not paired with a corresponding video frame, generating, by the joint network, at an output step, a probability distribution over possible speech recognition hypotheses based on the corresponding acoustic higher-order feature representation.

13. The computer-implemented method of claim 12, wherein the audio encoder comprises at least one of a first plurality of multi-head attention layers, a first conformer, or a first plurality of long short term memory (LSTM) layers.

14. The computer-implemented method of claim 13, wherein the audiovisual encoder comprises at least one of a second plurality of multi-head attention layers, a second conformer, or a second plurality of LSTM layers.

15. The computer-implemented method of claim 12, wherein generating the corresponding audiovisual higher-order feature representation comprises:
generating, at each of the plurality of output steps, a corresponding visual higher-order feature representation for the corresponding one of the video frames in the sequence of video frames; and
fusing the corresponding acoustic higher-order feature representation with the corresponding visual higher-order feature representation.

16. The computer-implemented method of claim 15, wherein fusing the corresponding acoustic higher-order feature representation with the corresponding visual higher-order feature representation comprises concatenating the corresponding acoustic higher-order feature representation with the corresponding visual higher-order feature representation.

17. The computer-implemented method of claim 15, wherein fusing the corresponding acoustic higher-order feature representation with the corresponding visual higher-order feature representation comprises applying cross-model attention to the corresponding acoustic higher-order feature representation with the corresponding visual higher-order feature representation.

18. The computer-implemented method of claim 12, wherein the operations further comprise:
receiving a sequence of non-blank symbols output by a final softmax layer;
generating, by a prediction network, based on the sequence of non-blank symbols, at each of the plurality of output steps, a dense representation;
selecting one of:
for each corresponding acoustic frame in the sequence of acoustic frames paired with the corresponding one of the video frames in the sequence of video frames, the corresponding audiovisual higher-order feature representation; or
for each corresponding acoustic frame in the sequence of acoustic frames that is not paired with any video frame in the sequence of video frames, the acoustic higher-order feature representation; and
generating, by the joint network, based on the dense representation and the selected one of the corresponding audiovisual higher-order feature representation or the corresponding acoustic higher-order feature representation, at each of the plurality of output steps, a probability distribution over possible speech recognition hypotheses.

19. The computer-implemented method of claim 18, wherein:
the prediction network comprises a two-layer bidirectional long short term memory (LSTM) model; and
the joint network comprises a multi-layer perceptron model.

20. The computer-implemented method of claim 12, wherein the audio encoder and the audiovisual encoder are trained jointly.

21. The computer-implemented method of claim 12, wherein the operations further comprise:
during a first training phase:
receiving a first set of training utterances comprising acoustic frames without corresponding video frames; and
training the audio encoder using the first set of training utterances; and
during a second training phase:
receiving a second set of training utterances comprising acoustic frames and corresponding video frames; and
training, while holding coefficients of the audio encoder fixed after the first training phase is complete, the audiovisual encoder using the second set of training utterances while the coefficients of the audio encoder are held fixed.

* * * * *